June 17, 1969     W. S. WEBB     3,450,857
GAS SHIELDING DEVICE
Filed Jan. 25, 1967

INVENTOR.
Walter S. Webb

United States Patent Office 3,450,857
Patented June 17, 1969

3,450,857
GAS SHIELDING DEVICE
Walter S. Webb, Albuquerque, N. Mex., assignor to the United States of America as represented by the United States Atomic Energy Commission
Filed Jan. 25, 1967, Ser. No. 612,296
Int. Cl. B23k 9/16, 35/38
U.S. Cl. 219—74      2 Claims

ABSTRACT OF THE DISCLOSURE

A device to supply inert gas shielding to a desired zone, e.g., oxidizable material while the material is in an oxidizable condition such as a weld that is still at an oxidizing temperature, which can be readily configured to conform generally to the shape of the oxidizable material or an associated workpiece. The device includes a flexible conduit having a flexible, porous, sintered metal wall along one side thereof which may be disposed adjacent said zone.

Background of invention

There are many materials which oxidize in air either naturally or because of some operation such as heating being performed on or with the material. This is particularly a problem in welding since either the weld material or the workpiece itself may oxidize relatively rapidly in air when heated by the welding operation.

In prior welding techniques, a gas shield has been placed around the welding electrode over the weld area and pressurized inert gas directed through the shield to the weld area. The pressurized gas thus prevents air from coming in contact with the weld during the welding operation. However, unless the shield is held in place until after the weld and workpiece have cooled below the oxidation temperature, oxidation may result. Further, if the workpiece is not flat, the shield may direct the inert gas unevenly over the weld area allowing air to reach the heated areas.

In a welding operation requiring a continuous weld over an extended weld joint, a shield of the type described is clearly unsatisfactory. In this type of situation, enclosures have been built to house the entire weld assembly as well as the workpiece itself. The enclosures are evacuated and then filled with an inert gas. Such a system requires, depending on the size of the workpiece, expensive vacuum and remote control equipment and considerable time in the added vacuum operation. In many applications, the size of the workpiece will negate the use of this technique.

In other applications, inert gas shields have been specially designed and fabricated for a particular weld depending on the contour, size and shape of the weld. Once the welding operation has been completed, the gas shield is either discarded or stockpiled with the thought that it might be useful if a similar weld is used in the future. These shields are expensive to fabricate since they are usually made for a particular application and may be very time consuming due to the lag time between need and fabrication.

Summary of invention

In order to overcome limitations of the prior art as noted above, it is an object of this invention to provide an improved device for furnishing an inert gas shield.

It is a further object of this invention to provide an inert gas shielding device which can be adapted to conform to the shape of a workpiece.

It is a further object of this invention to provide an inert gas shielding device which can be reused in different shapes without mechanical modifications.

It is a further object of this invention to provide an inert gas shielding device which can direct inert gas over a relatively large work area.

Various other objects and advantages will appear from the following description of one embodiment of the invention, and the most novel features will be particularly pointed out hereinafter in connection with the appended claims.

The invention comprises a flexible or readily deformable housing having a porous wall or surface therealong and generally coextensive therewith, and means for coupling a supply of inert gas to said housing.

Description of the drawings

The present invention is described in the accompanying drawings wherein.

Detailed description

Figure 1:
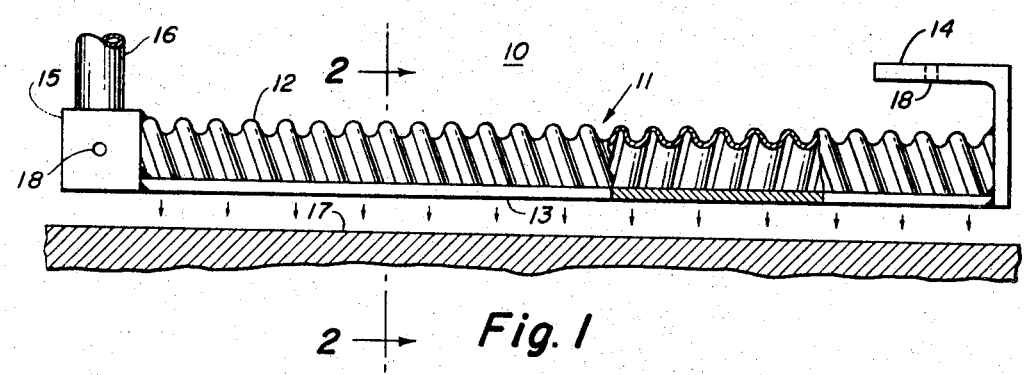
FIG. 1 is a side elevation view of an inert gas shielding device made in accordance with this invention.
Figure 2:
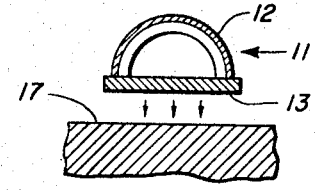
FIG. 2 is a cross-sectional view taken along line 2—2 of FIG. 1.

In the embodiment of the invention shown in FIGS. 1 and 2, flexible or deformable gas shielding device 10 comprises a tubular conduit portion 11 provided with a plurality of generally transversely or laterally extending folds or corrugations 12 to form essentially a flexible, arcuate bellows sealingly mounted, such as by brazing, on a flexible, porous member 13. Corrugations 12 can be either transverse or at some angle with the conduit portion 11's longitudinal axis. The conduit portion is brazed at one end to a mount 14 and at the other end to a chamber 15, thus closing and sealing conduit 11. Mount 14 and chamber 15 are provided with suitable tapped mounting holes 18. Chamber 15 has a gas coupling 16 fixedly mounted thereon which may be connected through a tube and valve means (not shown) to a supply of pressurized inert gas (not shown), such as argon or helium, in a manner well known in the art. It is readily apparent that the folds or corrugations 12 along conduit portion 11 facilitate the adaptation of shielding device 10 to any curvature having an axis or axes transverse to the longitudinal axis of the device.

The conduit portion 11 with its corrugations may be made of any flexible, impervious material such as copper or aluminum which is capable of withstanding high welding temperatures. Member 13 may be made from any porous, flexible material such as sintered copper, nickel, platinum, gold, silver or stainless steel, or in some applications a woven screen, which is capable of supplying a controlled amount of inert gas to the weld area. Porous material can be purchased commercially having pore sizes ranging from about 5 microns to about 165 microns. In particular applications, it may be desirable to provide some form of baffling, such as steel wool, within gas conduit 11 to equalize gas pressure along the conduit and thereby minimize pressure drop along the conduit.

Since the porosity of porous member 13 is generally constant along the length of member 13 and since the gas pressure will be greater at the conduit inlet, there will be a greater supply of gas directed towards the workpiece at the inlet end of conduit 11. The porosity of member 12 can be varied either laterally or longitudinally in order to vary the amount of inert gas supplied to a particular area of the workpiece depending on the desired gas shielding. For instance, if the shielding device 10 is passed longitudinally over a heated weld with mount 14 leading, it may be desirable to have increased porosity at the leading end of device 10 to increase still further the supply of gas at the leading end since the weld passing under the leading end is at a higher temperature and will oxidize more readily.

It is noted that the inert gas not only tends to prevent or inhibit oxidation, the gas also serves to aid in cooling the heated material.

In operation, conduit 11 is coupled through coupling 16 and chamber 15 to a controlled supply of inert gas. Gas shield 10 is then positioned over a workpiece, such as the surface 17 which may be a newly formed weld, and the inert gas supply turned on. The gas flows through coupling 16 and chamber 15 into tubular conduit 11 and permeates porous member 13. The gas is then, as shown by the arrows, directed against surface 17 preventing air from contacting surface 17 and thus preventing oxidation of the material.

Figure 3:
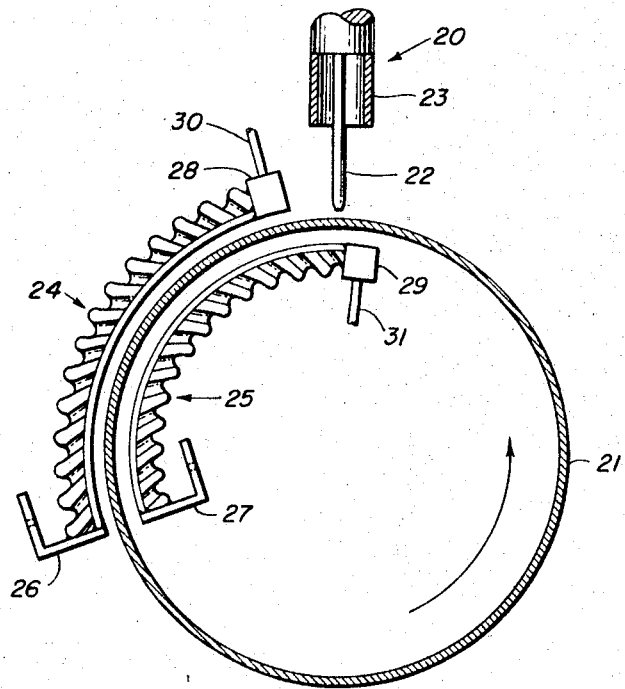
FIG. 3 is a side view of inert gas shielding devices illustrating their use over a cylindrical weld.

In FIG. 3, devices made in accordance with this invention are shown configured to conform generally to exterior and interior surfaces of a cylindrical article 21. An arc welding head 20 is adapted to form a continuous weld on a cylindrical workpiece 21 which is rotating in the direction of the arrow. Welding head 20 includes an electrode 22 and a gas shield 23. Inert gas is introduced through shield 23 to the weld area in a manner well known in the art. In prior welding operations, as the workpiece 21 was rotated and a continuous weld formed by welding electrode 22, the newly formed and still hot weld rotated from under the protective insert gas atmosphere of welding head 20 into air resulting in weld and workpiece oxidation.

The applicant has found that by adapting a pair of gas shielding devices 24 and 25 to conform to the exterior and interior curvature of workpiece 21, respectively, and positioning the shields so that the resulting gas flow is directed on the newly formed weld, oxidation of the weld and workpiece can be substantially eliminated. The gas shields can be fixedly mounted by mounts 26 and 27 and chambers 28 and 29 as part of the welding apparatus and an inert gas supply or supplies (not shown) can be coupled to chambers 28 and 29 through couplings 30 and 31 in a manner well known in the art. Thus, gas shielding devices 24 and 25 direct a protective inert gas atmosphere over both surfaces of the newly formed weld and the workpiece until the weld and workpiece have been cooled below oxidation temperature. It should be noted that devices 24 and 25 are generally identical, being made in accordance with this invention, and were merely bent to conform to the exterior and interior curvatures respectively of workpiece 21. Devices 24 and 25 can be reformed to conform to some other curvature as the need arises.

In a specific application of this invention, a gas shielding device was made in accordance with this invention and was used to shield a cylindrical weld. The porous member had an active porous area of about 6 sq. inches with a pore size of about 35 microns and used about 30 cu. ft. of inert gas per hour at an inlet pressure of about 30 p.s.i.

A gas shielding device made in accordance with this invention can be readily adapted to conform to and direct a protective inert gas atmosphere over a reactive material regardless of the shape or contour, either convex or concave curvatures, of the material or the workpiece supporting the material. The gas shield can be reused in a different operation by merely adapting the shield by bending it to conform to the contour of the new weld or workpiece. Work hardening induced from repeated bending can be removed by annealing. Further, gas shields can be made in accordance with this invention which are capable of directing a protective inert gas atmosphere over a relatively large area of a reactive material.

It will be understood that various changes in the details materials and arrangements of the parts, which have been herein described and illustrated in order to explain the nature of the invention, may be made by those skilled in the art within the principles and scope of the invention as expressed in the appended claims.

What is claimed is:

1. A device for distributing an inert gas over an adjacent heated surface from a position in close proximity to said surface comprising an impervious flexible conduit having a wall with a plurality of corrugations disposed generally transversally of the conduit to facilitate flexing of the conduit and conformability to said surface, impervious end walls closing and sealing the end portions of said conduit, a flexible porous sintered metal wall secured to and extending between said end walls along said impervious conduit having edge portions overlapping and peripheral portions disposed outwardly beyond outermost marginal portions of said corrugations, said edge portions of said sintered metal wall sealingly brazed to said end walls and to said conduit wall, and gas coupling means for directing inert gas into said conduit.

2. The device of claim 1 wherein the porosity of said sintered metal wall portion varies along the length of said wall portion to control the amount of inert gas directed from different areas of said device.

References Cited

UNITED STATES PATENTS

| | | | |
|---|---|---|---|
| 2,866,074 | 12/1958 | Ronay | 219—74 |
| 2,977,457 | 3/1961 | Houldcroft et al. | 219—74 |
| 3,125,666 | 3/1964 | Gorman et al. | 219—74 |

JOSEPH V. TRUHE, *Primary Examiner.*

J. G. SMITH, *Assistant Examiner.*